(12) United States Patent
Preidel et al.

(10) Patent No.: US 7,935,450 B2
(45) Date of Patent: May 3, 2011

(54) METHOD FOR OPERATION OF AN ENERGY SYSTEM, AS WELL AS AN ENERGY SYSTEM

(75) Inventors: Walter Preidel, Erlangen (DE); Bernd Wacker, Herzogenaurach (DE); Peter Van Hasselt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1079 days.

(21) Appl. No.: 11/723,268

(22) Filed: Mar. 19, 2007

(65) Prior Publication Data
US 2007/0248849 A1    Oct. 25, 2007

(30) Foreign Application Priority Data

Mar. 20, 2006  (DE) .......................... 10 2006 012 679

(51) Int. Cl.
*H01M 8/04* (2006.01)
*H01M 8/06* (2006.01)
*H01M 8/00* (2006.01)
*H01F 6/06* (2006.01)
*H01B 12/00* (2006.01)

(52) U.S. Cl. ........ 429/439; 429/408; 429/535; 505/163; 174/125.1

(58) Field of Classification Search .................... 429/13, 429/26, 439, 535, 408; 62/7; 505/163; 310/52–58; 174/125.1
See application file for complete search history.

(56) References Cited

U.S. PATENT DOCUMENTS
4,617,801 A    10/1986 Clark, Jr.

FOREIGN PATENT DOCUMENTS
| DE | 36 34 936 C1 | | 5/1988 |
| DE | 39 08 573 C2 | | 3/1992 |
| WO | WO 02/14736 | * | 2/2002 |
| WO | WO 02/14736 A1 | | 2/2002 |
| WO | WO 02/24523 A2 | | 3/2002 |

* cited by examiner

*Primary Examiner* — Ula C. Ruddock
*Assistant Examiner* — Thomas H. Parsons
(74) *Attorney, Agent, or Firm* — Harness, Dickey & Pierce, P.L.C.

(57) ABSTRACT

An energy system, in at least one embodiment, includes an energy production device for production of energy for the energy system with the aid of an working medium, a superconductor for low-loss conduction of electrical energy in the energy system, and a cooling device for cooling of the superconductor with the aid of a liquid phase of a cooling medium. The liquid phase of the cooling medium is, according to at least one embodiment of the invention, produced in the cooling device by condensation of a gaseous phase of the cooling medium, with the condensation of the gaseous phase of the cooling medium taking place by heat transfer from the gaseous phase of the cooling medium to the working medium. The overall efficiency of the energy system can improved by the heat transfer step.

20 Claims, 2 Drawing Sheets

METHOD FOR OPERATION OF AN ENERGY SYSTEM, AS WELL AS AN ENERGY SYSTEM

PRIORITY STATEMENT

The present application hereby claims priority under 35 U.S.C. §119 on German patent application No. DE 10 2006 012 679.3 filed Mar. 20, 2006, the entire contents of which is hereby incorporated herein by reference.

FIELD

Embodiments of the present application generally relate to a method for operation of an energy system, and/or to an energy system.

BACKGROUND

An energy system is known, for example, from WO 02/14736 A1.

One or more working media such as fuels, propellants or cooling media, is or are required for operation of an energy production device, depending on the nature of the energy produced (for example electrical energy, mechanical energy or thermal energy), the way in which the energy is produced and the operating conditions. One example of this is a fuel cell, whose working media are hydrogen and oxygen.

Particularly for energy systems in mobile applications, there is a requirement for the working media to be stored with a high energy density in as small a space as possible. For this purpose, the working media can be stored in liquid form at high pressure. In submarines, for example, hydrogen and oxygen for fuel cells are thus stored in special pressurized tanks in liquid form at 5-6 bar. However, storage of a working medium in liquid form has the disadvantage that it must be vaporized again, with energy being added, for use in the fuel cell.

Superconductors, and in this case in particular high-temperature superconductors from the family of YBCO conductors or bismuth cuprates, are already being used as low-loss conductors of electrical energy for initial applications in a large number of different electrical devices. These include rotating electrical machines, which operate as motors and/or generators, and whose stators and/or rotors are equipped with windings composed of a superconductor material, or static electrical devices such as current limiters or transformers. One disadvantage of the use of a superconductor is the energy which must be added for a cooling device, with the aid of which the superconductor is cooled to the temperature, normally of 20-100 K, which is required to maintain superconductivity.

The use of fuel cells to produce electrical energy, and of electrical devices with superconductors in a joint system is currently being investigated for widely varying energy systems. These include energy generators, distributors and load installations on marine vessels (see for example WO02/24523A1), large-machine installations and electrical traction systems for heavy-goods transports and locomotives. However, the energy that is required to liquefy the fuel and to cool the superconductor reduces the overall efficiency of energy systems such as these.

WO 02/14736A1 discloses an energy system for a submarine having a fuel cell, and having a current limiter with a high-temperature superconductor. In this case, the superconductor is cooled in a cryostat using liquid nitrogen. The liquid nitrogen is in turn cooled by a first cooling device in the form of a so-called refrigerator. The refrigerator has a cold head which projects into the cryostat, and nitrogen that has been vaporized in the cryostat is liquefied again by recondensation. For this purpose, the cold head absorbs heat from the vaporized nitrogen.

In addition, the electrical power bushings which extend into the cryostat from the outside are cooled with the aid of a second cooling device, in order to reduce the heat that is introduced into the cryostat. The second cooling device has a cooling medium with a boiling point which is higher than the condensation temperature of the liquid oxygen. The second cooling medium is, for example, liquid oxygen for operation of the fuel cell, which is stored in a liquid oxygen tank on board the submarine. The heat transfer from the electrical power supplies to the liquid oxygen results in vaporization of the liquid oxygen and, as a result of its vaporization enthalpy in cooling of the electrical power supplies. This on the one hand reduces the amount of heat introduced into the cryostat, and thus the electrical power consumed by the compressor of the first cooling device, while on the other hand reducing the energy required for vaporization of the liquid oxygen, thus, overall, increasing the overall efficiency of the energy system.

SUMMARY

Against this background, in at least one embodiment a method is specified for operation of an energy system, by which the overall efficiency of the energy system can be improved even further.

The method according to at least one embodiment of the invention provides for the liquid phase of the cooling medium to be produced in the cooling device by condensation of a gaseous phase of the cooling medium, with the condensation of the gaseous phase of the cooling medium taking place by heat transfer from the gaseous phase of the cooling medium to the working medium.

The liquefaction of the cooling medium and thus the cooling of the superconductor thus take place by way of the working medium which is required for energy production, for example of a fuel. This allows the energy required by the cooling device to cool the superconductor to be reduced, thus increasing the overall efficiency of the energy system. In the best case, there is no need whatsoever for a refrigerator system with a cold head and a compressor or a similar conventional device for liquefaction of the cooling medium, and this is associated with low investment costs as well as lower maintenance costs (life cycle costs), and higher reliability owing to the absence of the moving parts that are normally used in the refrigerator system.

In this case, an energy production device includes any type of device for production of energy in a technically usable form, for example electrical energy, mechanical energy or thermal energy. This includes, for example fuel cells, internal combustion engines as well as gas turbines and steam turbines.

According to one advantageous refinement of the method according to at least one embodiment of the invention, the energy production device is operated with a gaseous phase of the working medium, with the gaseous phase of the working medium being produced by vaporization of a liquid phase of the working medium, and with the heat transfer taking place from the gaseous phase of the cooling medium to the liquid phase of the working medium. The enthalpy of vaporization or the latent heat of vaporization of the working medium is thus used to cool the superconductor. At the same time, this reduces the energy required by the cooling device to cool the superconductor, and the energy required to vaporize the working medium, thus making it possible to improve the overall efficiency of the energy system particularly well.

The power which is required for vaporization of the working medium in typical applications is considerably greater than the cooling power requirement for the superconductor in all operating states, so that in the best case there is no need whatsoever for the cooling device.

According to a second advantageous refinement of the method according to at least one embodiment of the invention, the energy production device is operated with a gaseous phase of the working medium, with the gaseous phase of the working medium being produced by vaporization of a liquid phase of the working medium, and with the heat transfer taking place from the gaseous phase of the cooling medium to the gaseous phase of the working medium. The warming-up enthalpy of the gaseous phase of the working medium is thus used to cool the superconductor. At the same time, this reduces the energy required by the cooling device to cool the superconductor, and the energy required to warm up the working medium, thus making it possible to improve the overall efficiency of the energy system.

This method can also be used together with a method according to the first advantageous refinement of at least one embodiment of the invention in an energy system. In this case, the enthalpy of vaporization of the liquid phase of the working medium is used first of all, that is to say heat transfer from a gaseous phase of a first cooling medium to the liquid phase of the working medium results in vaporization of the liquid phase of the working medium and liquefaction of the gaseous phase of the first coolant, after which the warming-up enthalpy of the gaseous phase of the working medium is used, that is to say by heat transfer from a gaseous phase of a second cooling medium to the gaseous phase of the working medium, the gaseous phase of the working medium is heated and, at the same time, the gaseous phase of the second cooling medium is liquefied.

The heat transfer from the gaseous phase of the cooling medium to the working medium can also take place actively by means of a heat pump, which operates between the temperature level of the superconductor and the, preferably lowest, temperature level of the working medium.

The liquid phase of the working medium is preferably stored in a pressure tank under a pressure which is matched to the pressure of the gaseous phase of the cooling medium, in such a manner that the liquid phase of the working medium has a boiling point which is below the condensation temperature of the gaseous phase of the cooling medium. This is feasible in particular when a fuel or a substance which assists combustion, in particular hydrogen, natural gas or oxygen, is used as the working medium, and neon or nitrogen is used as the cooling medium.

If, for example, a pressure of 5 bar is chosen for the storage of hydrogen in a liquid-hydrogen pressurized tank, then the boiling point of the liquid-hydrogen is 27.1 K. In this case, neon can be used, for example, in order to cool a high-temperature superconductor in a high-temperature superconductor electric motor or a high-temperature superconductor generator. The neon system is preferably operated at a higher pressure than atmospheric pressure in order to prevent air from entering the neon area in the event of any possible leakage, for example at 1.1 bar (absolute). At a pressure of 1.1 bar, the condensation temperature of neon is 27.36 K and is therefore higher than the boiling point of liquid hydrogen. High-temperature superconductor current limiters are normally operated with liquid nitrogen at about atmospheric pressure, that is to say at 77 K.

An energy system according to at least one embodiment of the invention has an energy production device for production of energy for the energy system with the aid of a working medium, a superconductor for low-loss conduction of electrical energy in the energy system, and a cooling device for cooling the superconductor with the aid of a liquid phase of a cooling medium. In this case, the cooling device produces the liquid phase of the cooling medium by condensation of a gaseous phase of the cooling medium, for which purpose the cooling device has a heat exchanger for transfer of heat from the gaseous phase of the cooling medium to the working medium.

Advantages that have been mentioned in conjunction with the method according to at least one embodiment of the invention apply in a corresponding manner to the energy system according to at least one embodiment of the invention.

BRIEF DESCRIPTION OF THE DRAWINGS

The invention as well as further advantageous refinements of the invention according to the features of the dependent claims will be explained in more detail in the following text with reference to example embodiments in the figures, in which:

DETAILED DESCRIPTION OF THE EXAMPLE EMBODIMENTS

Figure 1:
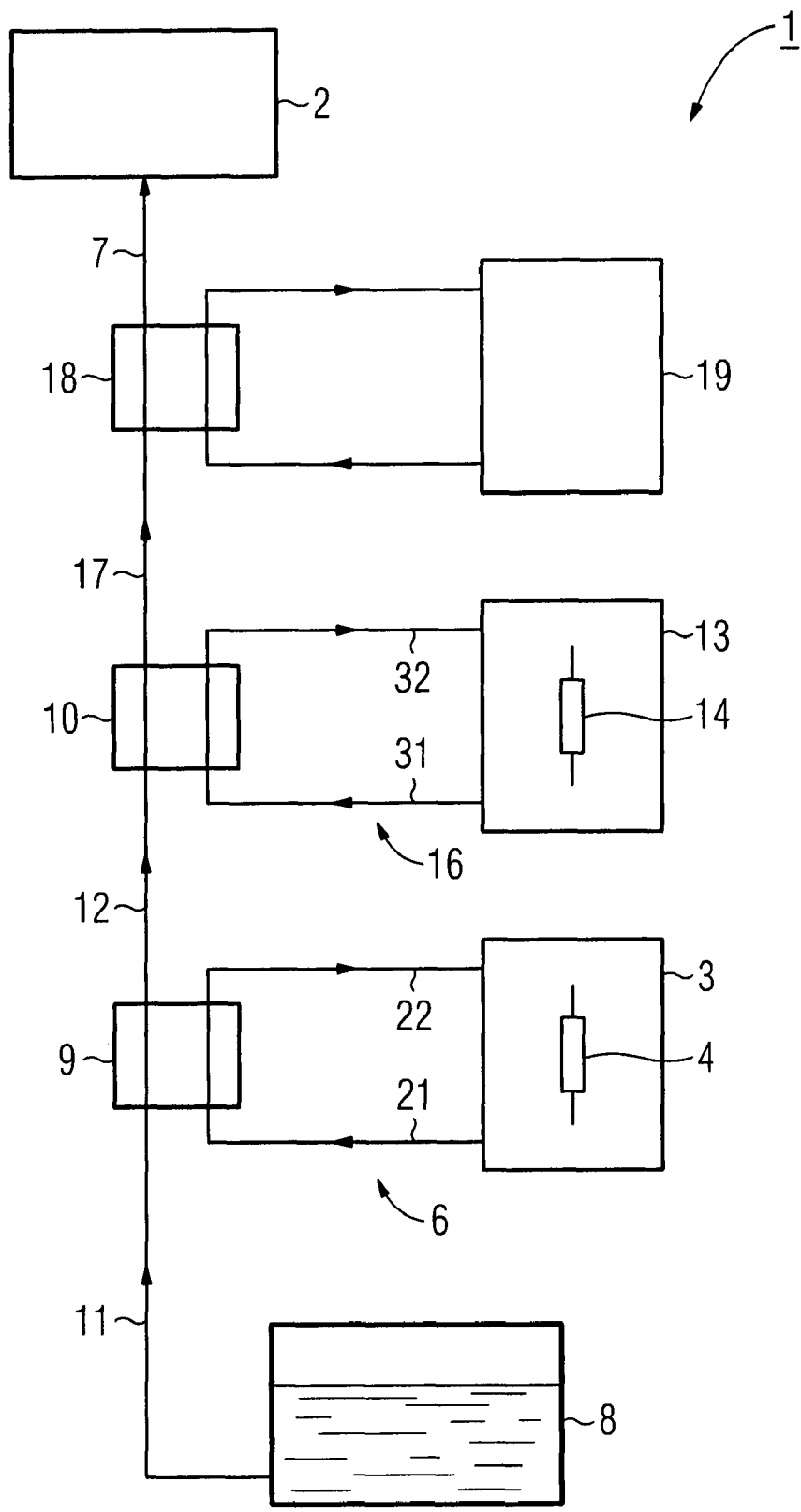
FIG. 1 shows, highly schematically, one configuration of an energy system according to an embodiment of the invention, illustrating various cooling options for superconductors.

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described.

FIG. 1 shows, highly schematically, an energy system 1 of a submarine including a fuel cell system 2 for production of electrical energy for propulsion of the vessel, and two electrical devices 3, 13, each having a high-temperature superconductor (HTS) 4 or 14, respectively, preferably from the family of YBCO conductors or the bismuth cuprates, for low-loss conduction of electrical energy in the energy system 1.

The first electrical device 3 is, for example, a rotating electrical machine such as a motor or a generator, whose rotor and/or stator has or have a high-temperature superconductor, in particular a high-temperature superconductor winding, or whose poles are composed of high-temperature superconductor magnets (so-called bulk material).

The second electrical device 13 is, for example, a high-temperature superconductor current limiter or a transformer. The high-temperature superconductor may in this case be in the form of a plate conductor, a ribbon conductor or bulk material. In the case of a bulk material, this may, for example, be composed of YBCO or bismuth high-temperature superconductor.

A cooling device 6 is used to cool the superconductor 4 with the aid of a first cooling medium, and a cooling device 16 is used to cool the superconductor 14 with the aid of a second cooling medium. The respective choice of the cooling medium is dependent on a large number of factors, for example on the superconductor material used, on the nature of the electrical device, on the amount of heat to be dissipated, and on the operating conditions. By way of example, the cooling medium for the electrical device 3 is neon, and that for the electrical device 13 is nitrogen. The transfer of coldness to the superconductor 4, 14 can take place directly via the cooling medium or indirectly via a further actively or passively circulated cooling medium (a pump-circulated cooling medium or a thermosyphon system, for example with oxygen, argon, nitrogen, neon, hydrogen or helium).

The cooling device 6 supplies the electrical device 3 in a circuit with a liquid phase of the first cooling medium, which is vaporized in the electrical device 3 by heat absorption from the superconductor 4 and its surrounding area. The resultant gaseous phase of the first cooling medium is carried out of the electrical device 3, is liquefied in the cooling device 6, and is then supplied to the electrical device 3 again.

In a corresponding manner, the second cooling medium in the second cooling device 16 is passed in a circuit through the electrical device 13.

In order to operate the fuel cells in the fuel cell system 2, they are supplied via a line 7 with, as the working medium, a gaseous fuel such as hydrogen, or with a substance which assists combustion, such as oxygen. The substance is stored in the submarine in liquid form in a tank 8 at the sufficiently high pressure that the boiling point of the substance is lower than the condensation temperature of the first cooling medium in the cooling device 6. If, for example, hydrogen is stored in liquid form at a pressure of 5 bar, then its boiling point is 27.1 K. This is therefore a fuel that is referred to in the specialist literature as "cryogenic". Before being supplied to the fuel cells, the liquid phase of the fuel must be converted by vaporization to the gaseous phase, and, in addition, must be raised to the operating temperature of the fuel cells by being heated further.

The various possible ways to increase the overall efficiency of the energy system will now be explained, with reference to FIG. 1, Option 1: Direct cooling by use of the heat of vaporization of the liquid phase of the working medium.

The liquid phase of the working medium can be vaporized by heat transfer from the gaseous phase of the first cooling medium to the liquid phase of the working medium, and the gaseous phase of the first cooling medium can be condensed by the heat of vaporization of the working medium.

For this purpose, the first cooling device 6 has a heat exchanger 9 to whose input side, the liquid working medium, in this case the liquid hydrogen, is supplied on its primary side via a line 11, and the gaseous phase of the cooling medium in this case gaseous neon, is supplied via a line 21 on its secondary side. On entering the heat exchanger 9, the liquid hydrogen is at a temperature which is lower than the temperature of the gaseous neon. This therefore results in heat being transferred from the gaseous neon to the liquid hydrogen.

Since, furthermore, the boiling point of the liquid hydrogen is lower than the condensation temperature of the gaseous neon, the heat transfer on the one hand makes it possible to vaporize the liquid hydrogen, and on the other hand the gaseous nitrogen to be condensed by the heat of vaporization. Gaseous hydrogen then leaves the heat exchanger on the output side via the line 12 on the primary side, and the liquid neon leaves it via the line 22 on the secondary side.

If the fuel cells are assumed to have an efficiency of 50%, a power of about 43 kW is required in order to vaporize the hydrogen at 27 K for operation of the fuel cells with a rated load of 5 MW electrical. The required cooling power for high-temperature superconductor machines with a power in the region of 5 MW is in the order of magnitude of about 100-500 W. The required cooling power for the high-temperature superconductor machine can thus be provided solely by the cryogenic fuel.

If the enthalpy of vaporization is precisely of the same magnitude as or is greater than the cooling power that is required for liquefaction of the gaseous neon, there is no need on the cooling device 6 side to have a separate device for liquefaction of the cooling medium, for example a cold head with a compressor, and this also avoids the energy required for this device. On the other hand, there is no need for a separate device for vaporization of the fuel on the fuel side, this avoiding the energy required for this purpose. The overall efficiency of the energy system can thus be improved, overall, in all cases.

Option 2: Indirect cooling by use of the warming-up enthalpy of the gaseous phase of the working medium.

For operation of the fuel cells, the hydrogen must be heated up to the temperature of the fuel cells. Liquid hydrogen that is stored at 5 bar in the hydrogen tank is typically at a temperature of somewhat more than 27 K after vaporization and therefore has to be heated even further.

The gaseous phase of the working medium can be heated further by heat transfer from the gaseous phase of the second cooling medium to the gaseous phase of the working medium, and the gaseous phase of the second cooling medium can be condensed by the warming-up enthalpy of the working medium.

For this purpose, the cooling device 16 has a heat exchanger 10 to whose input side the gaseous working medium, in this case the gaseous hydrogen, is supplied via the line 12 on the primary side, and to whose input side the gaseous second cooling medium, in this case gaseous nitrogen, is supplied via a line 31 on the secondary side. On entering the heat exchanger, the gaseous hydrogen is at a temperature which is lower than the condensation temperature of the gaseous nitrogen. This therefore results in heat being transferred from the gaseous nitrogen to the gaseous hydrogen. On the one hand, this results in the gaseous hydrogen being heated further, while on the other hand the gaseous nitrogen is condensed by the warming-up enthalpy. On the output side, heated gaseous hydrogen leaves the heat exchanger 10 via the line 17 on the primary side, and liquid nitrogen leaves the heat exchanger 10 via the line 32 on the secondary side.

If the warming-up enthalpy is precisely of the same magnitude, or is greater than, the cooling power required for liquefaction of the nitrogen, there is no need on the side of the cooling device 16 to have a separate conventional device for liquefaction of the cooling medium, for example a compressor, and the energy required for this device is also avoided. The complexity and energy required for heating up the gaseous phase of the fuel on the fuel side can be reduced, thus overall improving the overall efficiency of the energy system 1 even further.

The warming-up enthalpy (for example several 100 kW) required to warm the fuels up completely to room temperature or the operating temperature can also be used for further cooling tasks, for example for refrigerators and freezers on board the marine vessel, air-conditioning installations, cooling-water circuits, stator cooling for motors or generators, heat dissipation from fuel cells, etc. A further heat exchanger 18 is provided for this purpose and is connected with its primary side between the line 7 and 17, and with its secondary side being connected to a further cooling device 19.

Option 3: Active cooling by heat transfer from the gaseous phase of the cooling medium to the working medium by means of a heat pump.

If the gaseous phase of the cooling medium and the liquid phase of the working medium are at similar temperature levels, the heat transfer from the gaseous phase of the cooling medium to the working medium can be improved by means of a heat pump, which pumps heat from the gaseous phase of the cooling medium to the liquid phase of the working medium.

If, by way of example, only liquid oxygen but no liquid hydrogen is available in the submarine, since the liquid hydrogen is stored in some other form, or a different fuel (for example LNG) is used as the fuel, the heat transfer could be only very minor because of the similar temperature levels of the fuel and gaseous nitrogen. In this case, the heat can be transferred actively by means of a heat pump, which pumps heat from the gaseous nitrogen to the liquid oxygen. In comparison to a cryogenic cooler, which operates between a cryogenic temperature and room temperature, such cooling is considerably simpler and can thus be implemented at a lower cost. Depending on the application, options 1 to 3 can be combined with one another, or else can be used separately in order to increase the efficiency.

Figure 2:
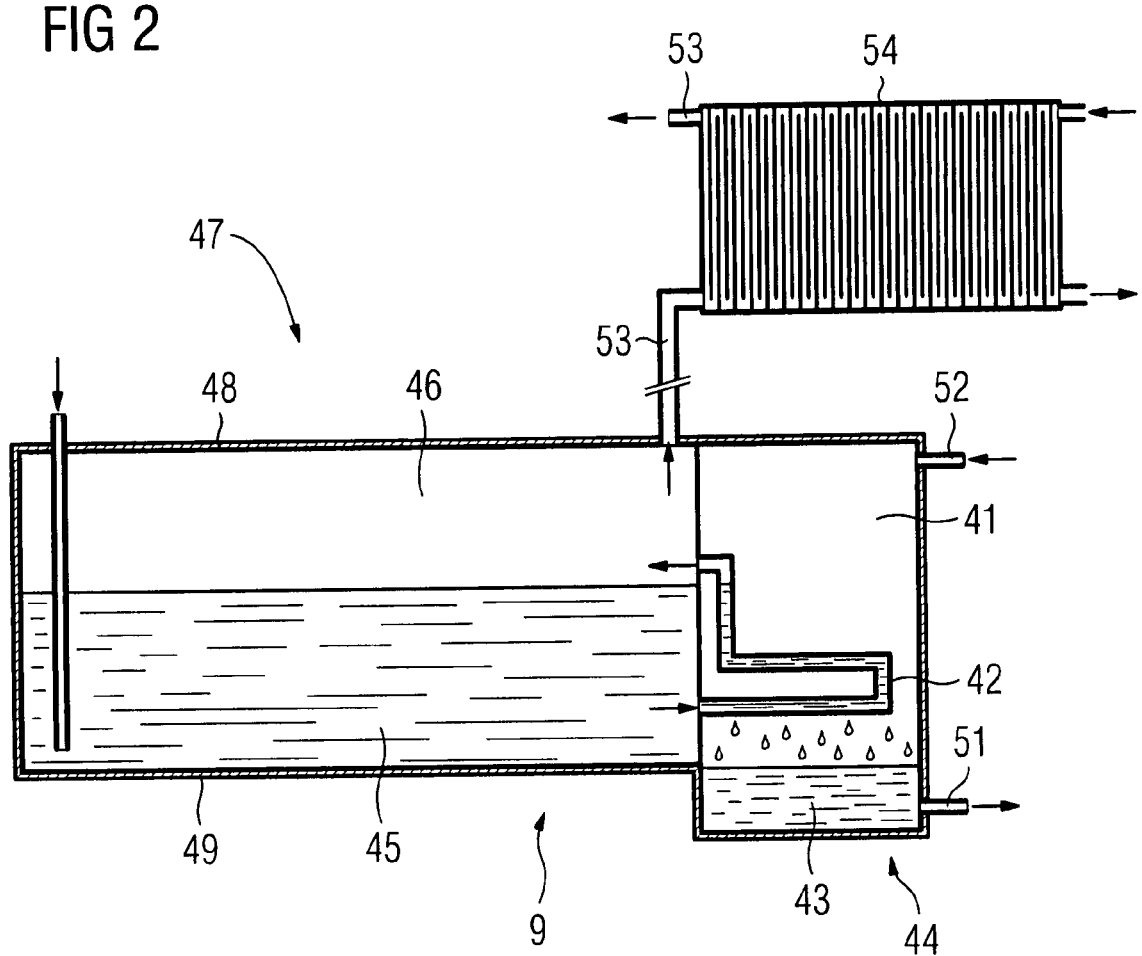
FIG. 2 shows a combination, which is particularly suitable for mobile applications, of a fuel tank and of a cooling medium tank for transferring heat from a gaseous phase of the cooling medium to a liquid phase of the fuel.

FIG. 2 shows an option, which is particularly advantageous for mobile applications, for heat transfer from a gaseous phase of a cooling medium to the liquid phase of a working medium for condensation of the gaseous phase of the cooling medium and vaporization of the liquid phase of the working medium, with the aid of the heat exchanger 9 shown in FIG. 1.

For this purpose, the heat exchanger 9 has a cooling medium gas area 41 which can be filled with a gaseous phase of a cooling medium, and a pipeline 42 which runs through the cooling medium gas area 41, in order to pass a liquid phase of the working medium through the cooling medium gas area 41.

The cooling medium gas area 41 is connected to a cooling medium liquid area 43 for storage of a liquid phase of the cooling medium. The cooling medium gas area 41 and the cooling medium liquid area 43 are subareas of a cooling medium tank 44. Cooling medium which is condensed on the pipeline 42 can thus drip into the cooling medium liquid area 43, and can be collected there.

The pipeline 42 connects a working medium liquid area 45 for storage of a liquid phase of the working medium to a working medium gas area 46 for storage of a gaseous phase of the working medium. The working medium gas area 45 and the working medium liquid area 46 are subareas of a working medium tank 47.

The working medium tank 47 and the cooling medium tank 44 are accommodated in a common container 48, and are surrounded by common insulation 49.

In the case of an energy system for a surface vessel or submarine, or a locomotive with fuel cells for energy production and a high-temperature superconductor motor as an electrical load, the working medium tank 47 is, for example, a hydrogen tank for storage of liquid hydrogen for the fuel supply for the fuel cells, and the cooling medium tank is a neon tank with liquid neon for cooling of the high-temperature superconductor motor.

By way of example, the neon tank 44 is connected in a cooling circuit of a cooling device for the high-temperature superconductor motor. The liquid neon is in this case supplied via a supply line 51 to the high-temperature superconductor motor, in which it is vaporized with cooling power being emitted. The vaporized, gaseous neon is then fed back via a return line 52 from the high-temperature superconductor motor, and is supplied to the neon tank again. The condensation temperature of the gaseous neon at an absolute pressure of 1.1 bar is about 27.36 K. The liquid neon in the neon tank is then likewise at a temperature of 27.36 K.

The hydrogen tank 47 is connected to a line 53 for supplying hydrogen to the fuel cell system, which is not illustrated in any more detail. The liquid hydrogen in the hydrogen tank 47 has a boiling point of 27.1 K at a pressure of 5 bar.

In order to heat the gaseous hydrogen further before it is supplied to the fuel cells, it is passed via the primary side of a further heat exchanger 54, which is connected in the line 53 and through the secondary side of which cooling water from the fuel cells flows. The hydrogen is heated further by heat transfer from the cooling water to the gaseous hydrogen, and the cooling water from the fuel cells is cooled down at the same time.

The liquid hydrogen is passed through the gas area 41 for the neon by way of the pipeline 42, so that the neon condenses out on the surface of the pipeline 42. In contrast, it would be problematic to pass gaseous neon through the liquid area 45 of the hydrogen, since the neon could solidify.

The pipeline 42 is composed of copper. The entire surface of the pipeline 42 in the gas area 41 is in this case matched to the required cooling power by means of the thermal conductivity of the copper at 27 K.

Thus, overall, the described combination of a fuel tank and of a cooling medium tank results in a space-saving capability, which is thus particularly suitable for mobile applications, for heat transfer from a gaseous cooling medium to a liquid fuel.

At the rated power of the overall system comprising the high-temperature superconductor motor and the fuel cells, the cooling power for the high-temperature superconductor motor is applied by means of the vaporization heat of the hydrogen.

When the system is on no load, cooling power is required for vaporization of the hydrogen. The motor is at rest, but must nevertheless be cooled. If approximately 10% of the rated power of the fuel cells is assumed to be the power required for the overall system when on no load, then a vaporization enthalpy of 1.7 kW is required of the hydrogen. This requirement for vaporization heat is sufficiently large to liquefy a sufficient amount of neon in order to allow the motor to be kept at the operating temperature.

At rest, when the fuel cells and the high-temperature superconductor motor are switched off, but can be brought into operation within a short time, no additional energy is required in order to cool the high-temperature superconductor motor.

In the switched-off state, only the hydrogen tank is at the temperature of 27 K, and this temperature is ensured at an overpressure of, for example, 5 bar by vaporization of the hydrogen. However, this means that hydrogen is emitted to the surrounding area all the time. This could be avoided by the cooling device of the motor, but only by way of external auxiliary energy or sufficient battery capacity. The cooling device from the high-temperature superconductor motor then cools the hydrogen tank. This results in a safety problem, resulting from vaporizing hydrogen, particularly in buildings. However, in this case, the auxiliary energy required for operation of the cooling device is generally available.

In principle, it is possible to dispense with a conventional cooling device for the motor by way of the combination of low-temperature components shown in FIG. 2, and to use only the liquid hydrogen for cooling. This cost advantage, contrasts with the disadvantage that it is then not possible to use the capability, as explained above, to cool the hydrogen tank by means of the cooling system.

Overall, the invention results in the following advantages:

The combination of the energy required for vaporization and/or heating of the working medium, for example cryogenic fuels for fuel cells, with the energy required for liquefaction of the cooling medium for a high-temperature superconductor device, leads to an increase in the system efficiency.

The absence of conventional cooling devices leads to reductions in investment costs, operating costs (inter alia because of reduced maintenance effort), space requirement, system weight and size, as well as an increase in the operational reliability.

In situations in which the aim is not to dispense with a conventional cooling device that is independent of cryogenic working media, for example for standby operation, considerable savings are still possible for the cooling device, in terms of complexity, size, investment costs and operating costs.

In the situation, as in option 1, in which the available cooling power is comparatively large, it is possible to save insulation in the design of the high-temperature superconductor device.

By way of example, pure vacuum insulation can be used without multilayer super insulation, or even vacuum-free insulation, which is even cheaper. Furthermore, in the case of rotating machines, the torque transmission element can also be chosen to be shorter, thus further reducing the machine size. The expensive GFC material which has been used until now at this point because of the low thermal conduction can also be replaced again at this point without any problems, for example by stainless steel.

In the case of neon-thermosyphon cooling for a high-temperature superconductor machine, the previously normally regulated back-heating at the cold head on a liquid hydrogen pressurized tank is not needed since the temperature conditions to be expected mean that the system in its own right precludes the possibility of freezing of the neon. The new refrigeration source (that is to say the hydrogen tank) which replaces the previous cooling device (for example the cold head with the connected helium circuit) in its own right has a temperature above the triple point as a result of the control of the pressure build up required for the fuel cell, that is to say freezing of the neon is precluded.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for operation of an energy system, comprising:
producing energy, using an energy production device, for the energy system, with the aid of a working medium including at least one of a fuel, a propellant and a substance which assists combustion;
using a superconductor for low-loss conduction of electrical energy in the energy system;
using a cooling device for cooling of the superconductor, with the aid of a liquid phase of a cooling medium, the liquid phase of the cooling medium being produced in the cooling device by condensation of a gaseous phase of the cooling medium, with the condensation of the gaseous phase of the cooling medium taking place by heat transfer from the gaseous phase of the cooling medium to the working medium.

2. The method as claimed in claim 1, wherein the energy production device is operated with a gaseous phase of the working medium, with the gaseous phase of the working medium being produced by vaporization of a liquid phase of the working medium, and with the heat transfer taking place from the gaseous phase of the cooling medium to the liquid phase of the working medium.

3. The method as claimed in claim 1, wherein the energy production device is operated with a gaseous phase of the working medium, with the gaseous phase of the working medium being produced by vaporization of a liquid phase of the working medium, and with the heat transfer taking place from the gaseous phase of the cooling medium to the gaseous phase of the working medium.

4. The method as claimed in claim 1, wherein the heat transfer takes place from the gaseous phase of the cooling medium to the working medium by way of a heat pump.

5. The method as claimed in claim 1, wherein at least one of neon and nitrogen is used as the cooling medium.

6. The method as claimed in claim 1, wherein the energy production device is a fuel cell system.

7. The method as claimed in claim 1, wherein the fuel is at least one of hydrogen and natural gas.

8. An energy system, comprising:
- an energy production device for production of energy for the energy system with the aid of an working medium including at least one of a fuel, a propellant and a substance which assists combustion;
- a superconductor for low-loss conduction of electrical energy in the energy system; and
- a cooling device for cooling of the superconductor with the aid of a liquid phase of a cooling medium, and for producing the liquid phase of the cooling medium by condensation of a gaseous phase of the cooling medium, for which purpose the cooling device includes a heat exchanger for transfer of heat from the gaseous phase of the cooling medium to the working medium.

9. The energy system as claimed in claim 8, wherein the heat which is transferred from the gaseous phase of the cooling medium to the working medium in the heat exchanger produces a gaseous phase of the working medium by vaporization of a liquid phase of the working medium, and the energy production device is operable with the gaseous phase of the working medium.

10. The energy system as claimed in claim 9, wherein the heat exchanger includes a cooling medium gas area, finable with the gaseous cooling medium, and including a pipeline, which runs through the cooling medium gas area, for carrying the liquid phase of the working medium through the cooling medium gas area.

11. The energy system as claimed in claim 10, wherein the cooling medium gas area is connected to a cooling medium liquid area for storage of the liquid phase of the cooling medium.

12. The energy system as claimed in claim 11, wherein the cooling medium gas area and the cooling medium liquid area are subareas of a cooling medium tank.

13. The energy system as claimed in claim 12, wherein the working medium tank and the cooling medium tank are surrounded by common insulation.

14. The energy system as claimed in claim 10, wherein the pipeline connects a working medium liquid area for storage of the liquid phase of the working medium to a working medium gas area for storage of the gaseous phase of the working medium.

15. The energy system as claimed in claim 14, wherein the working medium gas area and the working medium liquid area are subareas of a working medium tank.

16. The energy system as claimed in claim 9, wherein the heat which is transferred from the gaseous phase of the cooling medium to the working medium heats a gaseous phase of the working medium in the heat exchanger, and the energy production device is operable with the gaseous phase of the working medium.

17. The energy system as claimed in claim 8, wherein the heat which is transferred from the gaseous phase of the cooling medium to the working medium heats a gaseous phase of the working medium in the heat exchanger, and the energy production device is operable with the gaseous phase of the working medium.

18. The energy system as claimed in claim 8, wherein cooling medium is at least one of neon and nitrogen.

19. The energy system as claimed in claim 8, wherein the energy production device is a fuel cell system.

20. The energy system as claimed in claim 8, wherein the fuel is at least one of hydrogen and natural gas.

* * * * *